US011900672B2

(12) United States Patent
Lin et al.

(10) Patent No.: US 11,900,672 B2
(45) Date of Patent: Feb. 13, 2024

(54) INTEGRATED INTERNAL AND EXTERNAL CAMERA SYSTEM IN VEHICLES

(71) Applicant: Alpine Electronics of Silicon Valley, Inc., Santa Clara, CA (US)

(72) Inventors: Rocky Chau-Hsiung Lin, Cupertino, CA (US); Thomas Yamasaki, Anaheim Hills, CA (US); Koichiro Kanda, San Jose, CA (US); Diego Rodriguez Risco, Campbell, CA (US); Alexander Joseph Ryan, Mountain View, CA (US); Samah Najeeb, Menlo Park, CA (US); Samir El Aouar, San Jose, CA (US)

(73) Assignee: ALPINE ELECTRONICS OF SILICON VALLEY, INC., Santa Clara, CA (US)

(*) Notice: Subject to any disclaimer, the term of this patent is extended or adjusted under 35 U.S.C. 154(b) by 0 days.

(21) Appl. No.: 16/389,779

(22) Filed: Apr. 19, 2019

(65) Prior Publication Data

US 2019/0325219 A1     Oct. 24, 2019

Related U.S. Application Data

(60) Provisional application No. 62/661,492, filed on Apr. 23, 2018.

(51) Int. Cl.
| G06V 20/20 | (2022.01) |
| G06V 20/56 | (2022.01) |
| G06V 20/59 | (2022.01) |
| G06V 40/20 | (2022.01) |

(52) U.S. Cl.
CPC ............. *G06V 20/20* (2022.01); *G06V 20/56* (2022.01); *G06V 20/59* (2022.01); *G06V 40/20* (2022.01)

(58) Field of Classification Search
None
See application file for complete search history.

(56) References Cited

U.S. PATENT DOCUMENTS

| 2004/0169617 | A1* | 9/2004 | Yelton | G06T 15/205 |
| | | | | 345/1.1 |
| 2014/0063064 | A1* | 3/2014 | Seo | G01C 21/365 |
| | | | | 345/633 |
| 2016/0355133 | A1* | 12/2016 | Kim | G06F 3/04883 |
| 2017/0178498 | A1* | 6/2017 | Mcerlean | G08G 1/166 |
| 2017/0187963 | A1* | 6/2017 | Lee | G06F 3/013 |
| 2018/0048801 | A1* | 2/2018 | Kiser | G02B 27/144 |
| 2018/0079284 | A1* | 3/2018 | Choi | E05F 15/75 |
| 2018/0079427 | A1* | 3/2018 | Herz | B60W 50/10 |
| 2019/0047582 | A1* | 2/2019 | Anderson | B60W 50/08 |

\* cited by examiner

*Primary Examiner* — Peter Hoang
(74) *Attorney, Agent, or Firm* — Perkins Coie LLP (57) ABSTRACT

Devices, systems and processes for an integrated internal and external camera system that enhances the passenger experience in vehicles are described. One example method for enhancing a passenger experiences includes capturing a first set of images of an area around the vehicle using an external camera system, capturing a second set of images of one or more passengers inside the vehicle using an internal camera system, recognizing at least one gesture made by the one or more passengers based on the second set of images, identifying an object or a location external to the vehicle based on the first set of images and the at least one gesture, and displaying information related to the object or the location to the one or more passengers.

16 Claims, 10 Drawing Sheets

INTEGRATED INTERNAL AND EXTERNAL CAMERA SYSTEM IN VEHICLES

CROSS-REFERENCE TO RELATED APPLICATIONS

This application claims the benefit of U.S. Provisional Patent Application Ser. No. 62/661,492, filed Apr. 23, 2018, which is incorporated by reference herein in its entirety.

TECHNICAL FIELD

This document relates to systems, devices and processes that enhance the passenger experience in non-, partially- and/or fully-autonomous vehicles.

BACKGROUND

Vehicles are currently equipped with a variety of input and output devices that are leading to completely self-driving cars, but now need to be augmented or reconfigured to provide safe and enjoyable experiences inside the vehicle for the passengers. An integrated internal and external camera system may be used to provide an enhanced and safe user experience.

SUMMARY

Disclosed are devices, systems and methods for an integrated internal and external camera system that enhances the passenger experience in autonomous vehicles. This may be achieved by using the integrated internal and external camera system, as well as cloud-based services, and on focusing on passenger interests. In one aspect, the external camera can capture a complete view of the outside of the vehicle, which may be integrated with cloud-based information, and targeted to passenger interests; interests that may be inferred through the use of the internal camera that detects passenger gestures.

The above and other aspects and features of the disclosed technology are described in greater detail in the drawings, the description and the claims.

DETAILED DESCRIPTION

The transportation industry has been undergoing considerable changes in the way technology is used to control the operation of the vehicles. As exemplified in the automotive passenger vehicle, there has been a general advancement towards shifting more of the operational and navigational decision making away from the human driving and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

The move towards autonomous operation of vehicles has also resulted in a change in how users interact with the vehicles themselves. For example, in fully autonomous vehicles, the "driver" may be free to conduct any number of activities not typically possible (e.g., reading a book, watching a movie, looking at a passenger with whom he is engaged in conversation).

Embodiments of the disclosed technology are based on the recognition that the move towards autonomous operation of vehicles also has the ability to change the way in which the passengers interact with the environment around the vehicle. Passengers may be able to dwell longer on things seen in the surrounding landscape (e.g., a picturesque view of the ocean or architectural elements of buildings) or even engage with other drivers and social media applications in slow traffic.

But this opportunity also presents technological and safety challenges.

First, even if the passenger has an interest in more fully engaging with a surrounding environment, present technology does not generally support such interactions. Because traditional automobiles were designed around the premise that the driver is focused on the road and the non-driver passengers are primarily interested in being comfortable inside the cabin, there is relatively little technological infrastructure supporting a passenger's desire to engage with the external environment.

Second, passengers' interest in interacting with the environment outside the vehicle presents a safety concern. Namely, while such interactions may well be beneficial in fully autonomous vehicles, the same interactions (e.g., gazing at length at a picturesque landscape) may be extremely hazardous in vehicles that are not autonomous or only partially autonomous. And it is unlikely that the entire automotive industry will undergo a single, sudden change over from non-autonomous to fully-autonomous vehicles.

Thus, a safety problem arises as users themselves alternate between different vehicles with different levels of autonomous operation (e.g., the person's fully autonomous car, the person's spouse's partially autonomous car, a non-autonomous rental car, a friend's non-autonomous car, etc.). Namely, a user that has adopted the social behaviors of greater interaction with external environments that are possible and desirable in an autonomous vehicle may not abandon those same behaviors when driving a non-autonomous vehicle, thereby potentially endangering himself, other passengers in the vehicle, pedestrians, and passengers in other vehicles. It should not be underestimated the way in which minor changes in vehicle environments can cause significant driver confusion. There have been numerous reports of crashes and deaths due to "unintended acceleration" when a driver operated an unfamiliar vehicle, with the ultimate cause being that the driver was unaccustomed to the position of the pedals and inadvertently engaged the accelerator instead of the brake. Thus, minor variations in vehicle environments have the possibility to introduce significant safety risks.

And such variations are likely to increase in the future. Even as autonomous automobiles become commercially viable, it is unlikely that the entire automotive market will make a single, sudden shift to autonomous vehicles. Due to considerations of price, user preference, and other factors, it is likely that the new car market in the coming years will consist of a mixture of different levels of non-, partial-, and fully-autonomous vehicles. Adding to that the existing heterogenous mix of vehicles already on the road, it is likely that drivers in the future will encounter many different types of vehicle operations. And for the reasons described above, this has the potential to introduce significant safety concerns.

Thus, for both technological and safety reasons, the inventors recognize the need for advancements in vehicle technology relating to passenger's interaction with the environment outside the vehicle.

Embodiments of the disclosed technology include an integrated internal and external camera system, which enables any passenger in any non-, partially- or fully-autonomous vehicle to be entertained and interact with the outside world, and ensures that they reach their destination safely. The SC system allows car passengers to interact with the outside world by capturing images on demand from cameras facing out from the car.

Figure 1:
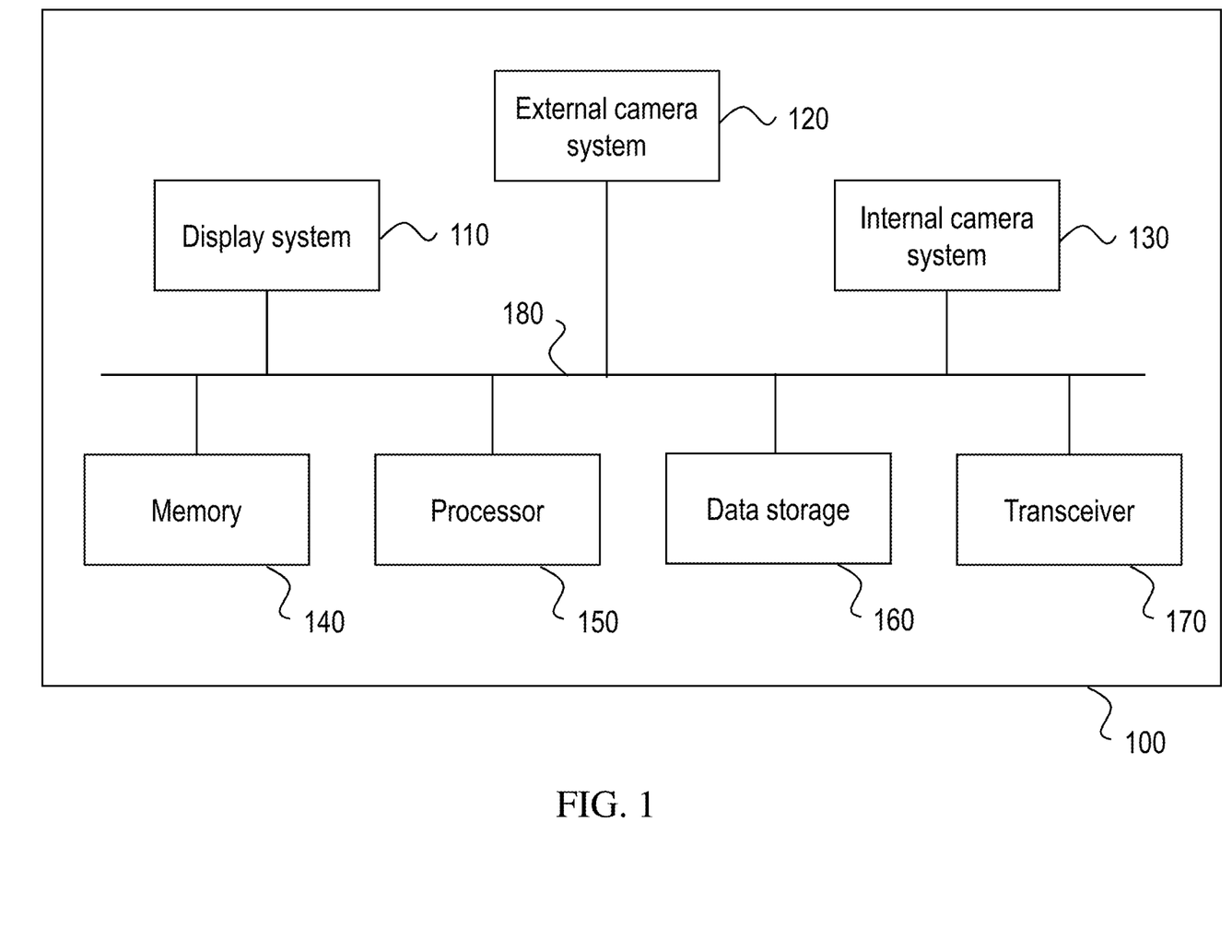
FIG. 1 shows a block diagram of the subcomponents of an integrated internal and external camera system, according to an embodiment of the disclosed technology.

FIG. 1 shows an example block diagram of the subcomponents of an integrated internal and external camera system. As shown in FIG. 1, the exemplary integrated internal and external camera system 100 may include a display system 110, an external camera system 120, an internal camera system 130, a memory 140, a processor 150, a data storage 160 and a transceiver 170. One or more of these components may be connected directly, or through the coupling 180 (e.g. a wired communications bus). In some embodiments, only the memory 140, processor 150, data storage 160, transceiver 170 and the display system 110 may be coupled together by the coupling 180. The transceiver 170 may be configured to communicate with other devices co-located in the vehicle (e.g. internal and external camera systems, 130 and 120, respectively). In other embodiments, the transceiver may be configured to communicate with external devices, access nodes, and/or vehicles.

The external camera system 120 may be provided in various forms. In some embodiments, the external camera system 120 may include a camera on the roof of the vehicle. In such embodiments, the camera may provide a 360° view of the area around the vehicle. In one example, the camera may include two back-to-back fisheye lenses. The back-to-back fisheye lenses may collectively capture a 360° view around the vehicle. The system may include a software or hardware processor may be provided to create a single 360° image from the images separately captured by the two fisheye lenses. In another example, the camera may include a wide-angle lens. For example, the wide-angle lens may rotate (e.g., driven by a motor) in order to capture a 360° view around the vehicle. In such embodiments, the system may use image stabilization and/or image processing to stitch the images together to provide the 360° view. In another example, a single fisheye lens may be used. In such embodiments, the single fisheye lens may provide a smaller field-of-view as compared to other embodiments. The external camera system may be provided in other ways in various embodiments (e.g., three fisheye lenses, two wide-angle lenses).

In some embodiments, the external camera system 120 may include multiple cameras, or a camera array, and rely on post-processing with image stitching and stabilization to produce the 360° view.

In some embodiments, the external camera system 120 may include an in-built transceiver that communicates with the transceiver 170. In other embodiments, the external camera system may communicate with the transceiver 170 via the coupling 180. The images and/or vide taken by the external camera system 120 may be stored in the data storage 160.

Figure 2A:
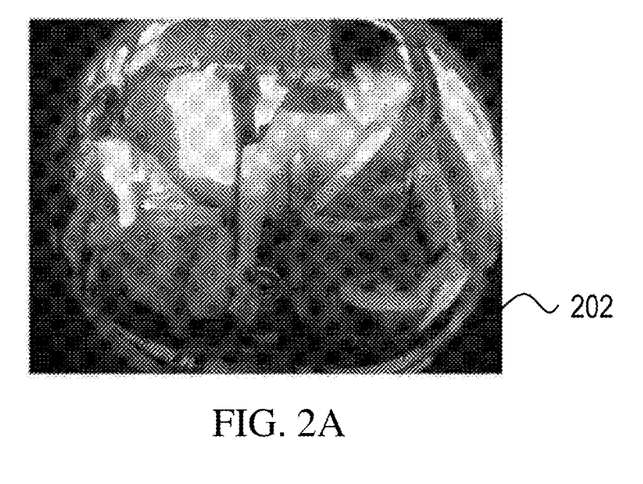
FIGS. 2A, 2B and 2C show example images from an internal camera, according to an embodiment of the disclosed technology.
Figure 2B:
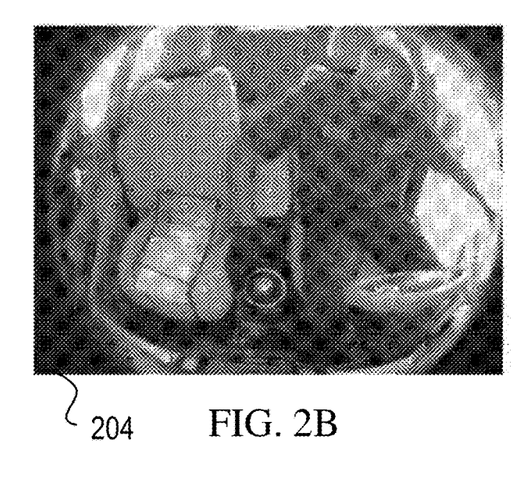
Figure 2C:
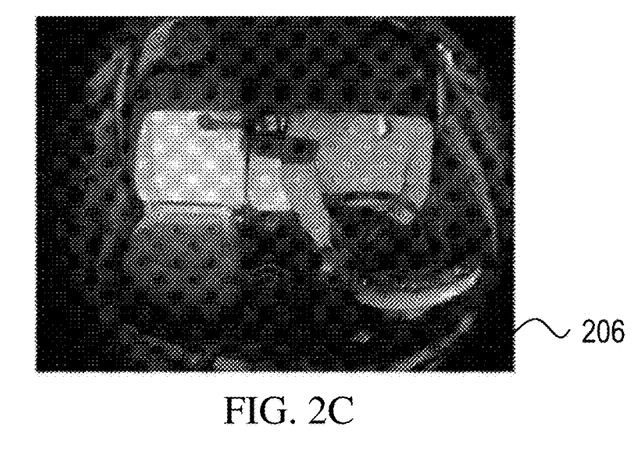

As shown in FIG. 1, the system 100 includes the internal camera system 130 that is used, in an example, to track gestures made by passengers in order to determine their evolving interests. In some embodiments, the internal camera system 130 may include a first camera that is adjacent to the rear-view mirror of the vehicle and a second camera that is adjacent to the main cabin light. For example, the first camera adjacent to the rear-view mirror may be a fisheye lens, and example images from this type of internal camera system are shown in FIGS. 2A, 2B and 2C.

Figure 3:
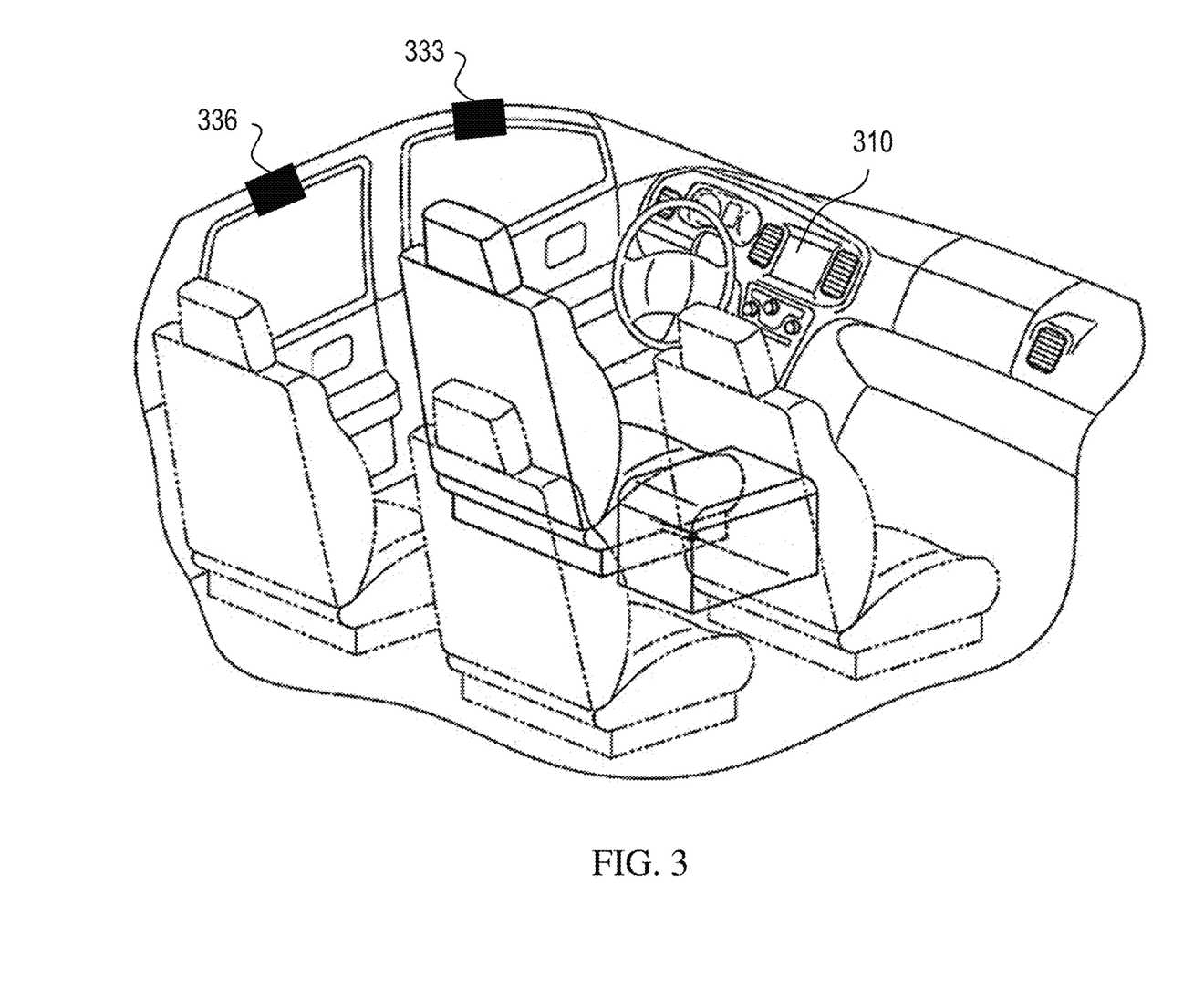
FIG. 3 shows an example of the internal cameras, according to an embodiment of the disclosed technology.

In some embodiments, the internal camera system 130 may include a single camera for each seating row in the vehicle. For example, FIG. 3 shows internal cameras 333 and 336 which are used to track the passengers in the front and back rows, respectively. As shown in the example in FIG. 3, the camera 336 may be placed adjacent to the coat hook in the vehicle.

In some embodiments, one or more cameras of the internal camera system 130 may support infrared (IR) capabilities, which are better suited to working in nighttime conditions.

As shown in FIG. 1, the system 100 includes processor 150, which may interface with the external and internal camera systems, 120 and 130, respectively, through either the coupling 180 and/or wirelessly through in-built transceivers and the transceiver 170. In some embodiments, the processor 150 may be used to perform image stabilization and/or stitching for the external camera system 120 and to perform gesture recognition on the images captured by the internal camera system 130.

In some embodiments, the processor 150 may be used to provide content that was saved from previous trips using the vehicle, or based on user/passenger preferences. In other embodiments, the content may be obtained from a remote cloud-based service via transceiver 170, and then further processed locally based on the passenger requirements by the processor 150. In yet other embodiments, the data storage 160 may be large enough to store content related to a specific trip or associated with a certain destination, especially in the cases when it is known that wireless coverage will not be reliable.

As shown in FIG. 1, the system 100 includes the display system 110. In some embodiments, the display system 110 may include a touchscreen display in the center portion of the infotainment system (also referred to as the "center stack"). The display system 110 may further include interactive displays embedded into the windows. For example, the windows of the vehicle may be transparent liquid crystal displays (LCDs).

As shown in FIG. 1, the system 100 includes the transceiver 170. In some embodiments, the transceiver 170 may support the Wi-Fi protocol to enable messaging and communication capabilities between the passengers and within the vehicle. For example, a passenger may control the external camera system 120 using their mobile phone over the Wi-Fi connection. In another example, a passenger may replicate the screen (or a portion thereof) of their laptop or mobile phone onto the display system 110.

In some embodiments, the transceiver 170 may support cellular services (e.g. Long Term Evolution (LTE)) or Dedicated Short Range Communications (DSRC) in order to enable the passengers to communicate outside the vehicle, or with other vehicles. Communication with other vehicles may include social interactions (e.g. crowd-sourced recommendations, following another vehicle, etc.) or vehicular safety communications (e.g. keeping a safe following distance, emergency procedures, etc.).

Figure 4:
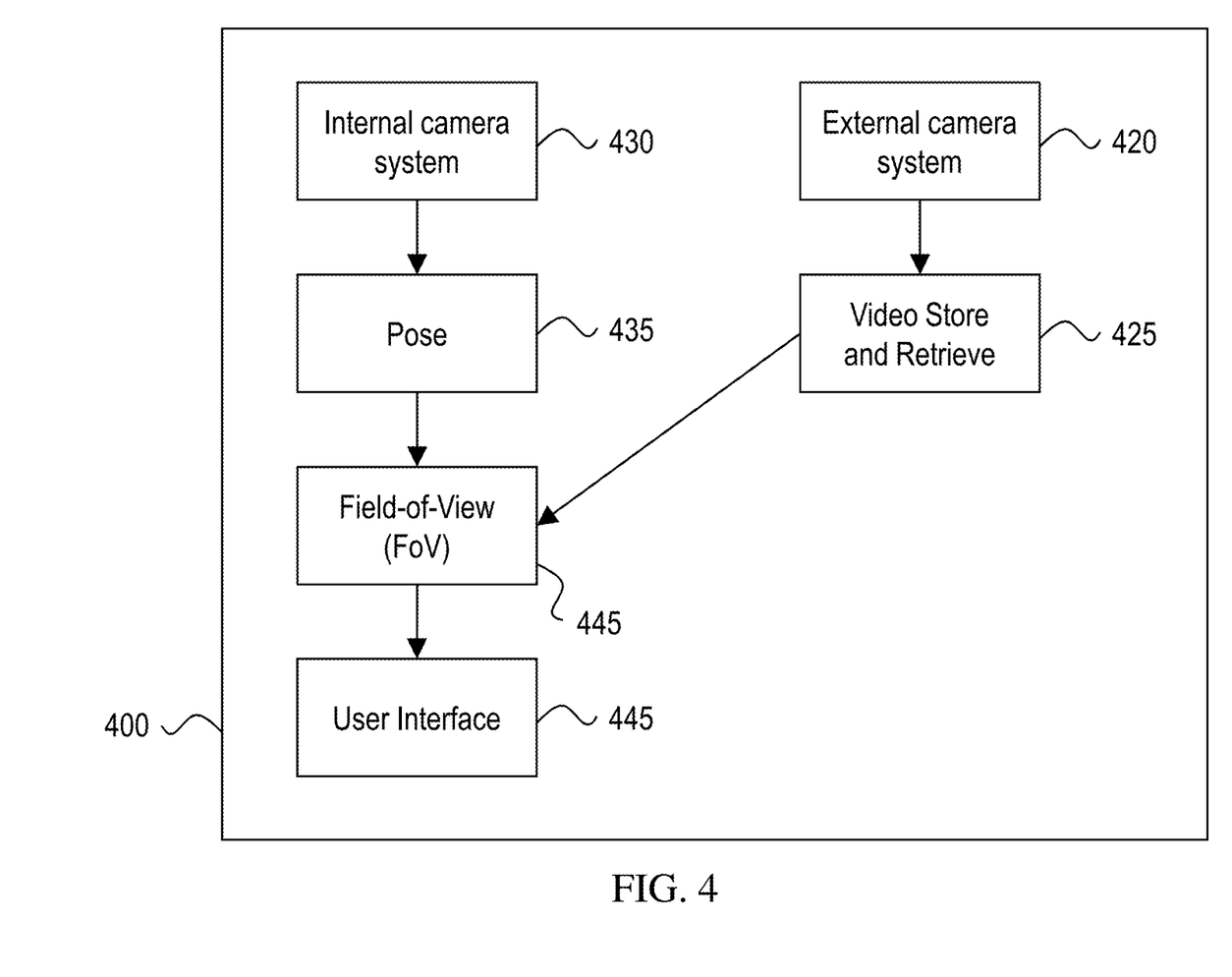
FIG. 4 shows another block diagram of the subcomponents of an integrated internal and external camera system, according to an embodiment of the disclosed technology.

FIG. 4 shows another example block diagram of the subcomponents of an integrated internal and external camera system 400, and an example operational flow, according to an embodiment of the disclosed technology. As shown in FIG. 4, the system 400 includes an external camera system 420 and an internal camera system 430. The internal and external camera systems are used to continually monitor the inside and outside of the car. The in-cabin views are used to determine the position and orientation of each passenger face. The outside cameras record the views of the outside world continuously. In some embodiments, the external camera system includes a full 360° camera capable of viewing all objects around a vehicle in a single frame. In other embodiments, multiple cameras (or a camera array) may be implemented.

On-demand (e.g. by gesture or by tapping a touch sensitive window) the position and orientation (or pose) of a passenger's face recorded and timestamped, as indicated by the pose component 435 of the system 400. This user-interaction may be referred to as an "event." The face position and orientation may be then used to determine the view the passenger was seeing (or focused on) at the moment of the event. The timestamp is then used to get the corresponding video frame from the outside camera of the external camera system.

In some embodiments, the Pose component 435 may use standard machine learning algorithms to determine the location of faces on images obtained from the internal camera system 430. Once faces are extracted, standard machine learning algorithms can further be used to extract facial landmarks. These facial landmarks may be used to compute the position and orientation (or "pose") of the face relative to the camera (e.g. using the Perspective-n-Point algorithm). The Pose component may also be used to extract gestures made by the passenger.

In some embodiments, the Pose component 435 may use dlib, OpenCV and OpenPose libraries to determine the facial landmarks from images captured by the internal camera system. In some embodiments, the pose of the face may be determined based on vector math that determines the relative positions of the head, eye and/or ears to the windows and the cameras of the internal camera system. In other embodiments, eye tracking may be employed to determine the pose of the face of one or more passengers in the autonomous vehicle.

The outside frame is cropped to match the Field-of-View the passenger had during the event, as indicated by the Field-of-View component 445 of the system. This frame is presented to the passenger either on a screen inside the car, or on a transparent display on the window.

In some embodiments, the Field-of-View component 445 may be used to estimate the view of the passenger based on the output of the Pose component 435 and knowledge of the relative locations of the windows and the cameras of the internal camera system 430. The images and video recorded by the external camera system 420 may be then be processed (e.g. cropped, rotated, skewed, resized, etc.) to match the passenger view. This process is referred to as FoV.

The passenger can now interact with an image of the view he or she had in the recent past, as indicated by the User Interface component 445 of the system.

In some embodiments, the Video Store and Retrieve component 425 stores images and video captured by the external camera system 420. The images are timestamped. These images may be searched on demand by timestamp, or location. The cache for the camera system can vary from a small cache to a larger cache to serve as a vehicle black box drive recorder functionality.

In some embodiments, the passenger may:
(1) See previous or subsequent video frames;
(2) Crop and edit video sequences;
(3) Zoom in/out of specific images and/or video streams;
(4) Highlight an area of the image and perform a visual search. Either from a machine learning component inside the car or a web API (e.g. to get the operating hours and reviews of a restaurant that got his/her attention);
(5) Use applications to tag or modify the image;
(6) Share the image; and/or
(7) Use any third-party application to interact with the images and video.

In some embodiments, metadata such as GPS location of the car can be used to enhance the search results and additional data presented to the passenger.

In some embodiments, the position and orientation of the passenger face can be used to determine if he or she is focusing/tracking a specific outside area. Focusing/tracking a particular area is an indication of interest and contextual information (landmark information, coupons, . . . ) may be then presented to the passenger on the in-cabin screen or the window.

In some embodiment, the system may leverage information from the other vehicular sensors (e.g., LiDAR, radar, ultrasonic, acoustic, etc.) to improve the search results that are displayed to the passenger. For example, a radar system may be used to locate the boundaries of an available parking spot in which the vehicle may self-park after the user has indicated interest in stopping at a nearby location.

Passengers may use a variety of input modalities to enhance and personalize their experience in the autonomous vehicle. In some embodiments, the windows of the vehicle may be covered in pressure sensitive film. This enables a passenger to tap on the window to identify an external object or point of interest, and/or select some of the content being displayed on the transparent LCD window screen.

In an example, tapping on the window to identify an external object may further include recognizing the gaze of the passenger, and presenting the user with a zoom option.

Figure 5A:
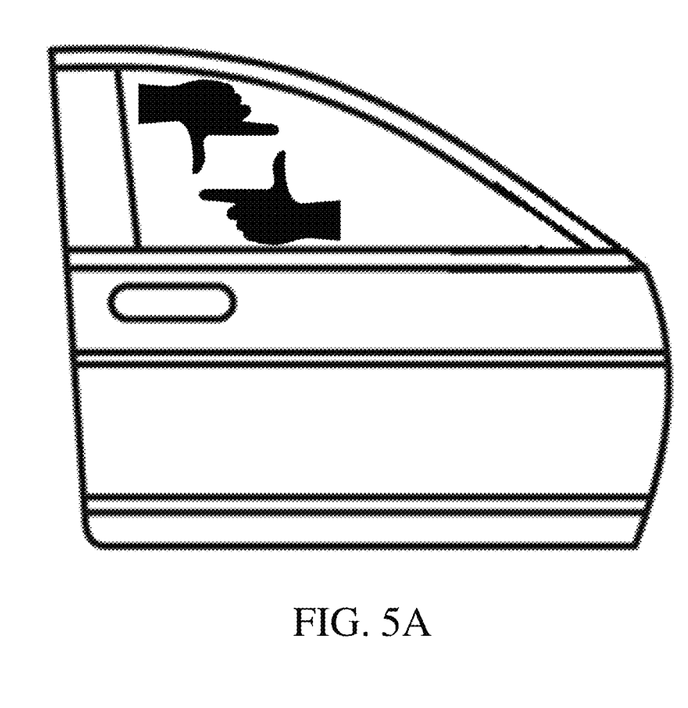
FIGS. 5A and 5B show examples of passenger gestures that may be detected by the internal cameras, according to an embodiment of the disclosed technology.
Figure 5B:
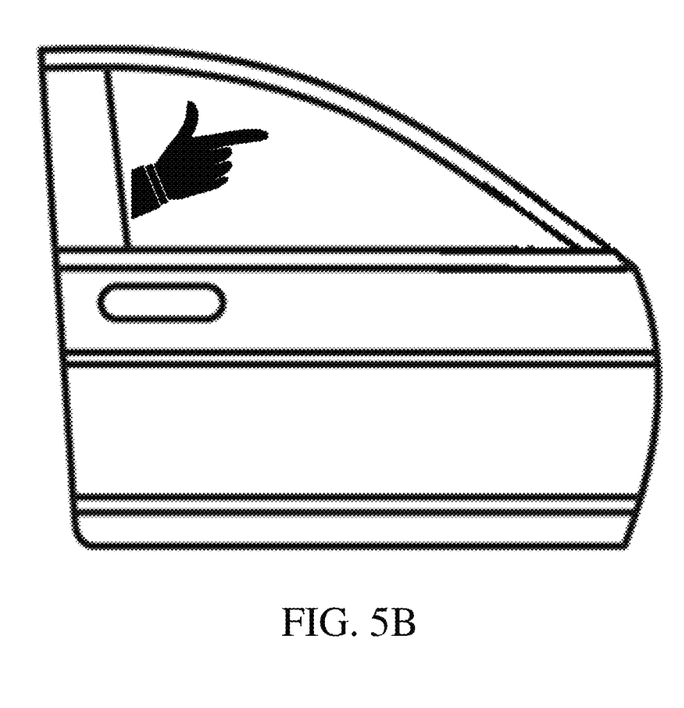

In some embodiments, the passenger may identify an external object or point of interest by using a gesture instead of tapping a pressure-sensitive film on the window. FIGS. 5A and 5B show examples of passenger gestures that may be detected by the internal cameras, according to an embodiment of the disclosed technology.

FIG. 5A shows a "frame" gesture made by a passenger that may be used to determine the focus on the passenger based on images captured by the internal camera system, as well as the relative positions of the passenger, the cameras, and the windows. In some embodiments, the object, location or landmark may then be identified and further relevant information displayed on the display system. FIG. 5B shows a "pointing" gesture made by a passenger, which may be processed in a manner similar to that described in FIG. 5A.

Since the integrated internal and external camera systems are continually monitoring the passengers and surroundings, respectively, any interest shown by a passenger in an external object, location or landmark, may be captured, and replayed with any relevant information at the passenger's convenience. In some embodiments, the transceiver may connect with a cellular network to obtain even more information or recommendations from crowd-sources services.

In some embodiments, the external camera system may be controlled by a mobile phone, tablet, or other personal computing device. This enables a passenger to focus on any external object or point of interest based on either a live feed from the external camera system or a recorded set of images and/or video. For example, the user may pass a certain location or landmark, and then replay the feed from the external camera system to select an external object or point of interest. The passenger may then choose to obtain additional information regarding their choice, and may optionally have the vehicle navigate toward the selected location. All this may be performed directly from the passenger's personal device which may be in constant communication with the system.

The embodiments described in the context of FIGS. 5A and 5B include a passenger identifying a point-of-interest, for which information is then retrieved and displayed. However, in an urban or downtown environment, different passengers may have different interests, and may be pointing or gesturing to different points of interest. In one representative aspect, the system may be programmed to recognize (based on identifying the passengers using, for example, facial recognition) the primary passenger (e.g., the owner of the vehicle or the account under which the vehicle has been procured) and display information for the point-of-interest or external activity that is of interest to the primary passenger on the main display in the vehicle (e.g., display system 110 in FIG. 1, or display 310 in FIG. 3). In another representative aspect, the system may be configured to display information for each passenger (based on their gestures or points of interest) on their respective mobile phones, tablets or computing devices.

The hardware architecture and user interface elements described above are used in conjunction with software and content elements to deliver an enjoyable experience to the passengers of an autonomous vehicle.

In some embodiments, the passengers may be able to interact with transactional applications, which can enable them to find out additional information regarding shopping and entertainment opportunities in the neighborhood that the autonomous vehicle is currently traveling through.

Figure 6A:
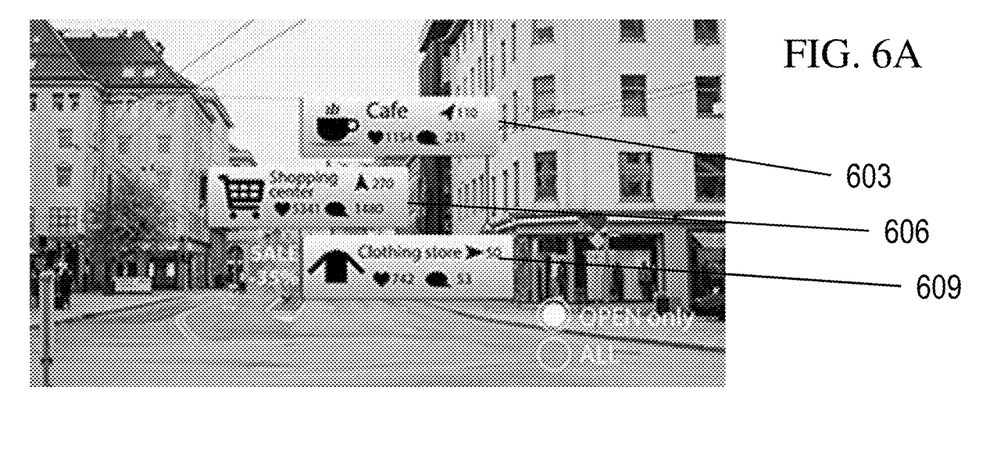
FIGS. 6A and 6B show examples of content overlays on a window of an autonomous vehicle, according to an embodiment of the disclosed technology.
Figure 6B:
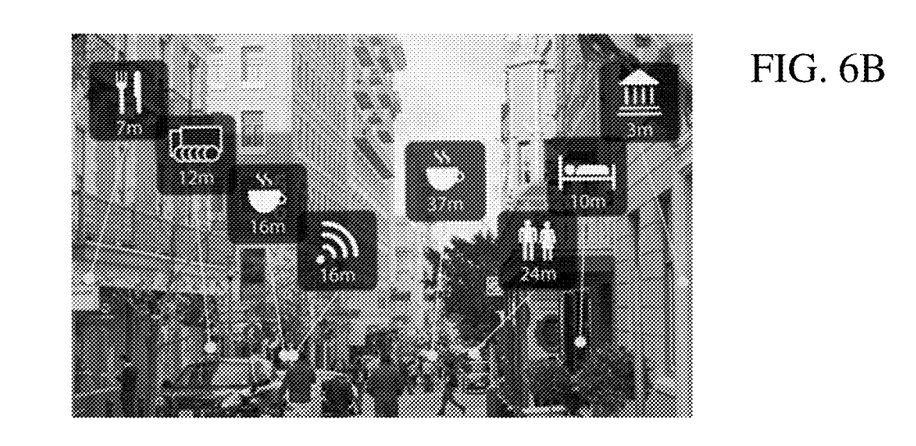

FIGS. 6A and 6B show examples of content overlays on a window of an autonomous vehicle, according to an embodiment of the disclosed technology. As shown in FIG. 6A, the view out of a window may be augmented by pop-up information indicating the presence of a café (603), a shopping center (606) and a clothing store (609). Upon selecting one of these options, additional information regarding store hours, promotions, sales, may be displayed based on user preferences and current store inventory information. FIG. 6B shows a similar augmented reality overlay and uses icons to provide relevant information to the passengers.

Figure 6C:
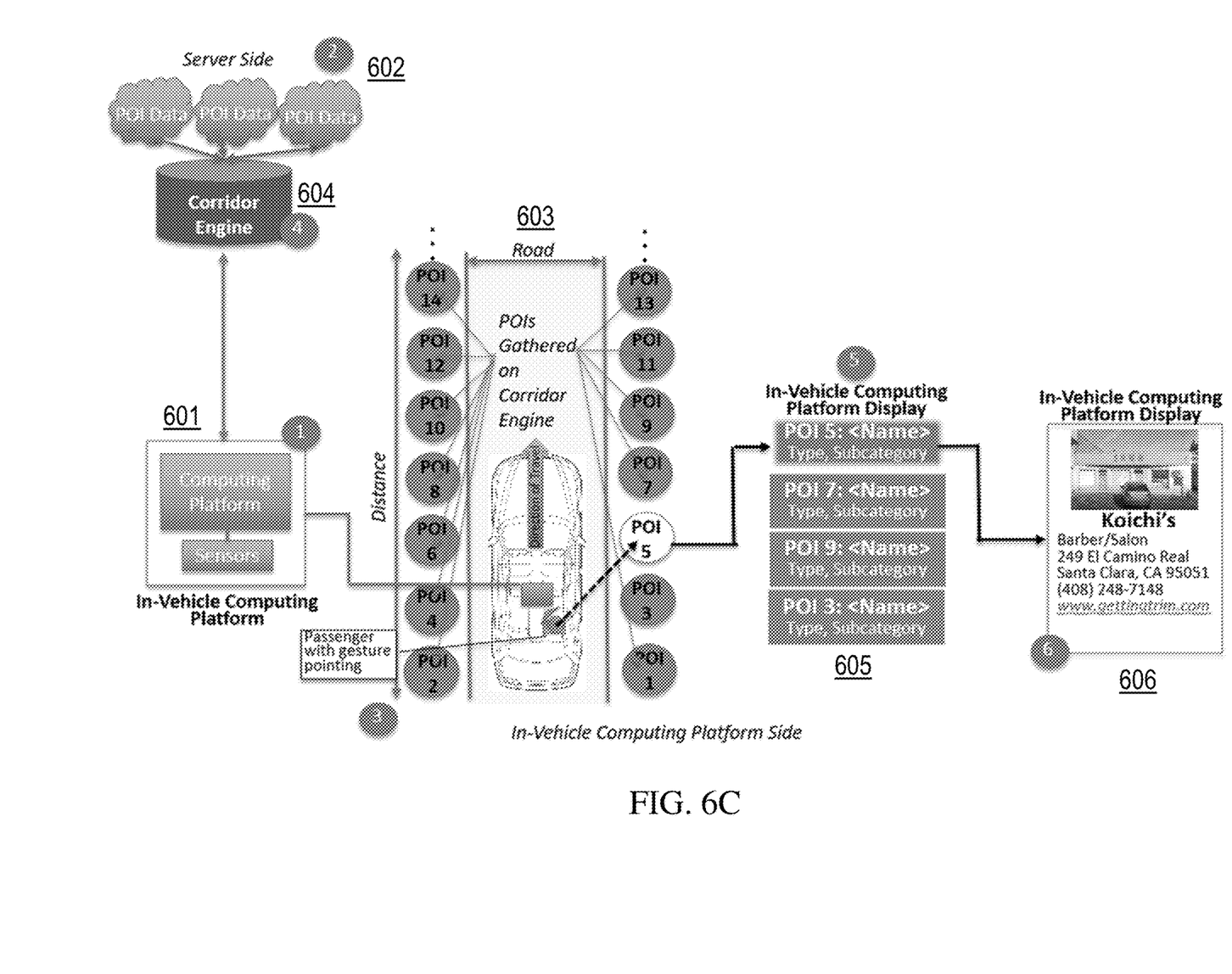
FIG. 6C shows another example of a content overlay, based on a corridor engine, resulting in point-of-interest (POI) streaming functionality, according to an embodiment of the disclosed technology.

FIG. 6C shows another example of the processing, based on a corridor engine, that results in point-of-interest (POI) streaming functionality, e.g., the examples shown in FIGS. 6A and 6B. As shown in FIG. 6C, the POI streaming functionality is based on interactions between a remote server (602, 604) and the in-vehicle computing platform (601).

In some embodiments, and in the context of FIG. 6C, the in-vehicle computing platform 601 includes the vehicular sensors, the computing platform and communication devices (not explicitly shown in FIG. 6C). The in-vehicle computing platform 601 interacts with the server 602 that includes a database with point-of-interest data that may be periodically updated based on the current location of the vehicle. The corridor engine 603 on the server identifies and/or selects the points of interest that are displayed to the passengers in the vehicle based on the vehicle's location, and provides additional (or specific) information for certain points of interest that correspond to those gestured to by a passenger in the vehicle. The results and POI information are displayed on the in-vehicle computing platform display.

In some embodiments, the corridor engine includes a relational database that may be updated (or adapted) based on both the location of the vehicle and the identity of the passengers, thereby being able to provide POI listing for various categories and sub-categories that are more relevant to the passengers than the results of a more traditional search engine. The corridor engine may also incorporate information from a passenger's social media account to continue to streamline the search results for that passenger.

In some embodiments, the passengers may interact with a variety of social network applications. In an example, a Pokemon Go style game may be played through the transparent LCD windows of the autonomous vehicle. In another example, the passenger may point to a location or landmark that is trending in social media feeds, which could result in the autonomous vehicle navigating toward the new destination. In another example, passengers may participate in video conferences, or play games with other passengers. In some embodiments, the other passengers may be in the same vehicle or nearby vehicles, and the games may be based on the common surrounding area (e.g. counting how many types of a certain vehicle are seen, or where vehicles are from based on difference license plates).

The safety of the passengers in an autonomous vehicle is a paramount concern, and the integrated internal and external camera system may be used to ensure that the passengers travel safely from their origin to their destination. In some embodiments, the internal camera system that continually monitors the passengers may be used to determine whether the passenger is still alive or not. For example, the determination may be based on monitoring gestures per minute, respiration, or other such physiological factors. In some embodiments, facial gestures of pain may be explicitly monitored and would enable detection of a heart attack or stroke.

In some embodiments, the internal camera system may be used to ensure that the integrity of the vehicle is not compromised. For example, fleet operators may use the system for liability reasons and insurance purposes.

In some embodiments, local driving conditions (e.g. potholes, fender benders that cause traffic jams, etc.) may be recorded by the system, and may be disseminated to other vehicles in the area. Similar information, when received by the system, and verified by the external camera system, may be used for navigational purposes (e.g. to use an alternate route in case of construction activities).

Figure 7:
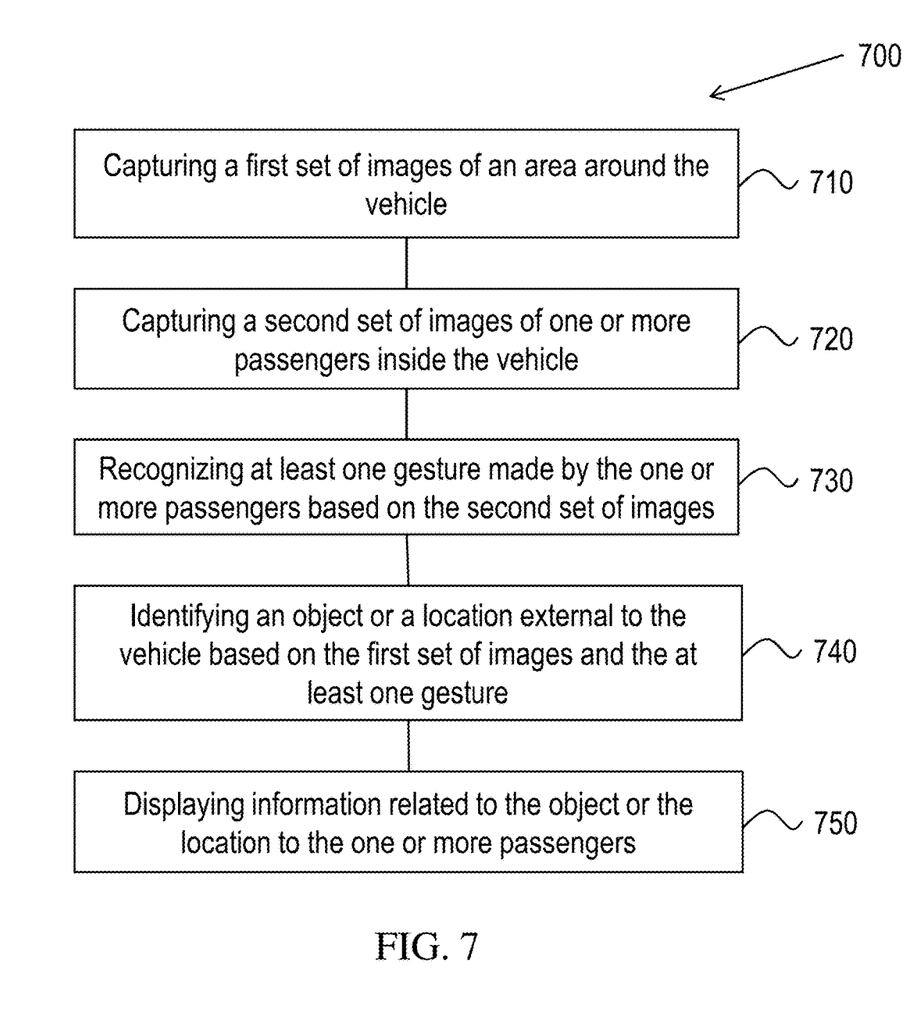
FIG. 7 shows an example method for using an integrated internal and external camera system, according to an embodiment of the disclosed technology.

FIG. 7 shows an example method 700 for using an integrated internal and external camera system, according to an embodiment of the disclosed technology. The method 700 includes, at step 710, capturing a first set of images of an area around the vehicle. In some embodiments, the external camera system may capture a 360 view of the area surrounding the vehicle, and may be implemented using a single or multiple cameras.

The method 700 includes, at step 720, capturing a second set of images of one or more passengers inside the vehicle. In some embodiments, the internal camera system may continually capture images of each of the passengers inside the vehicle using, for example, cameras in each row of the vehicle. In another example, a first camera adjacent to the rear-view mirror and a second camera adjacent to the main cabin light may be used to monitor the vehicle's passengers.

The method 700 includes, at step 730, recognizing at least one gesture made by the one or more passengers based on the second set of images. In some embodiments, recognizing the at least one gesture may include first estimating a pose (position and orientation) of the passenger and then identify the gesture being made. For example, the pose may indicate in which direction a passenger is focusing or looking. The gesture may be a pointing gesture, a "frame" gesture made with two hands, or some other gesture.

The method 700 includes, at step 740, identifying an object or a location external to the vehicle based on the first set of images and the at least one gesture. In some embodiments, the pose and gesture of the one or more passengers may be used to infer an object or location outside the vehicle that the passenger is interested in. In some embodiments, the passenger may explicitly identify an object or location using their personal device.

The method 700 includes, at step 750, displaying information related to the object or the location to the one or more passengers. In some embodiments, information related to the identified object or location may be shown on a display surface closest to the passenger that requested this information. For example, the information may include retail information about and shopping opportunities in stores of interest to the passenger.

Figure 8:
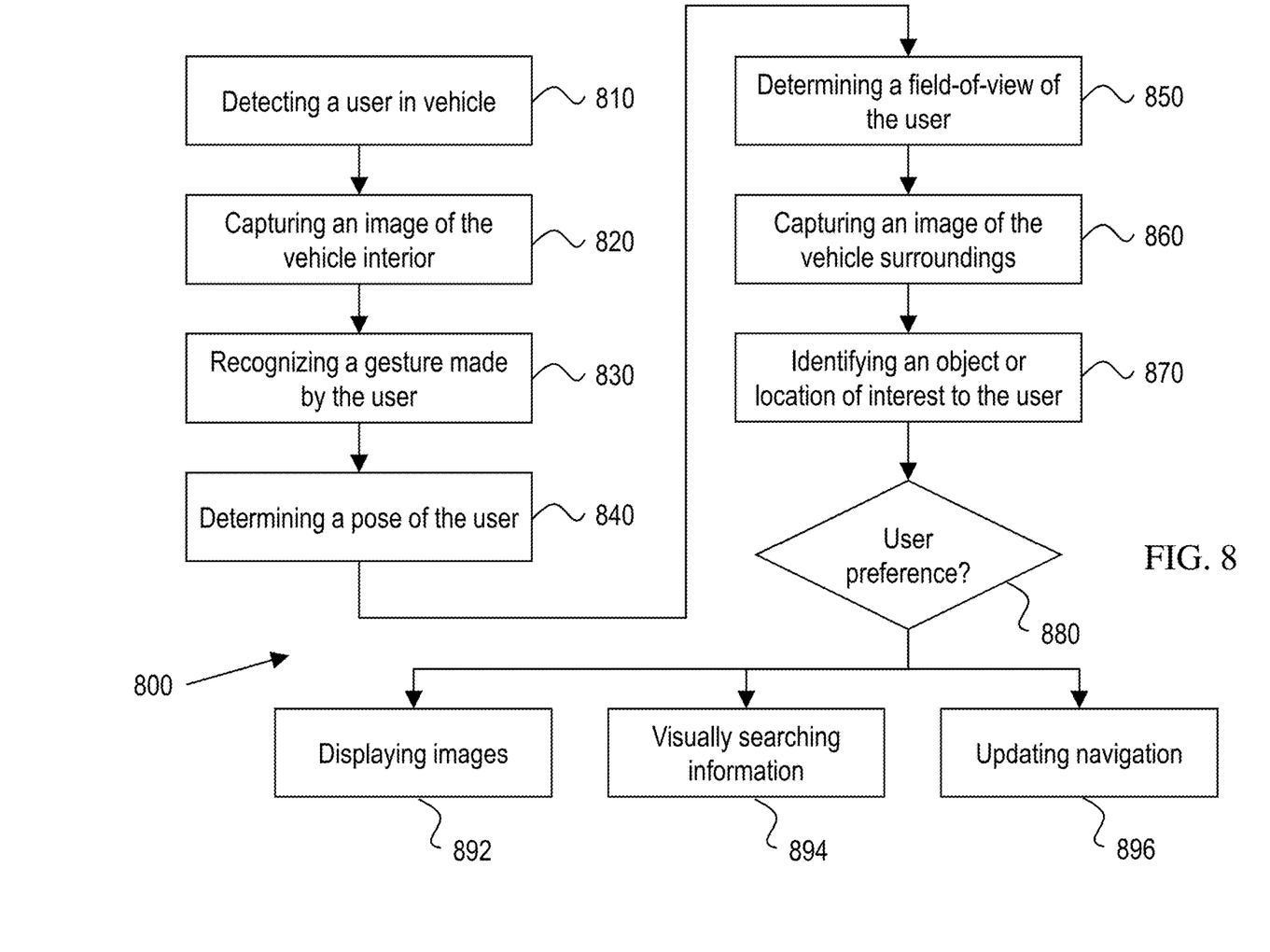
FIG. 8 shows another example method for using an integrated internal and external camera system, according to an embodiment of the disclosed technology.

FIG. 8 shows another example method 800 for using an integrated internal and external camera system, according to an embodiment of the disclosed technology. The method 800 includes, at step 810, detecting a user in vehicle. In some embodiments, the internal camera system may be used to detect the presence of a user inside the vehicle. For example, the techniques described in U.S. Pat. No. 9,760,827 ("Neural Network Applications in Resource Constrained Environments" to Lin et al., issued Sep. 12, 2017, and which is hereby incorporated by reference in its entirety) may be used to determine the presence and current state of the driver and/or another passenger.

The method 800 includes, at step 820, capturing an image of the vehicle interior. In some embodiments, the internal camera system may be used to continually monitor the interior of the vehicle. In an example, a camera in each row of the vehicle may be used. In another example, a first camera adjacent to the rear-view mirror and a second camera adjacent to the main cabin light may be used.

The method 800 includes, at step 830, recognizing a gesture made by the user. In some embodiments, the gesture made by the user may be a pointing gesture or a "frame" gesture made with two hands. In other embodiments, the gesture may include an explicit indication by the user using an input device or on a personal device connecting to the integrated internal and external camera system.

The method 800 includes, at step 840, determining a pose of the user. In some embodiments, the position and orientation (pose) of the face of each of the passengers is determined based on processing images and/or video from the internal camera system. For example, OpenCV and OpenPose libraries may be used to determine the pose of a passenger.

The method 800 includes, at step 850, determining a field-of-view (FoV) of the user. In some embodiments, the field-of-view corresponds to the portion of the surroundings that the user is interested in or focused on. For example, the pose of the user and the relative locations of the windows and the cameras of the internal camera system may be used to determine the portion of the surroundings that may be then highlighted for the user.

The method 800 includes, at step 860, capturing an image of the vehicle surroundings. In some embodiments, the image of the vehicle surroundings may be captured using a camera on the roof of the vehicle with a 360 field of view. In an example, the camera may be a single camera with back-to-back fisheye lenses. In another example, the camera may be multiple cameras or a camera array.

The method 800 includes, at step 870, identifying an object or location of interest to the user. In some embodiments, identifying an object or location of interest to the user may include cropping an image and/or video feed from the external camera system to correspond to the field-of-view that was determined in step 850. In some embodiments, adjacent images may be overlaid, or specific images may selected from the image and/or video stream to highlight certain features that the user is interested in.

The method 800 includes, at step 880, determining a user preference based on the cropped image and the identification of the object or location of interest to the user. In one example, and based on the user preference, the method 800 may include displaying images (892) of that object or location from different perspectives, or from a crowd-sources application to learn more about the object or location. In another example, and based on the user preference, the method 800 may include visually searching information (894) related to the object or location of interest to the user. For example, in the context of FIGS. 6A and 6B, the cropped image may be overlaid with information about various retail and shopping opportunities. In yet another example, and based on the user preference, the method 800 may include updating the navigation of the vehicle (896), e.g., the vehicle may slow down so the user can appreciate the object or location, or the user may change the destination to the identified object or location.

Figure 9:
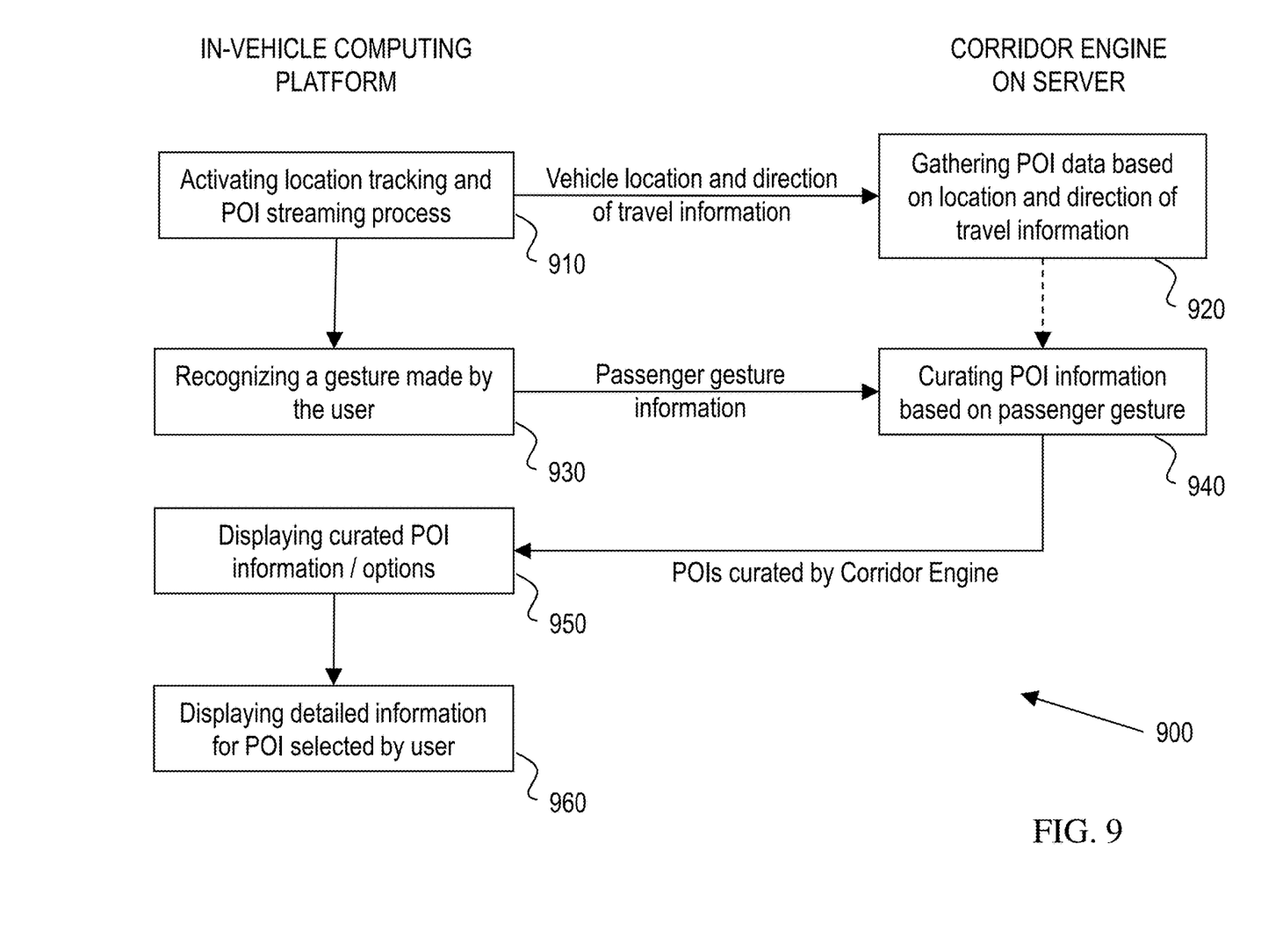
FIG. 9 shows yet another example method for using an integrated internal and external camera system for point-of-interest (POI) streaming, according to an embodiment of the disclosed technology.

FIG. 9 shows an example method 900, in view of FIG. 6C, for using an integrated internal and external camera system for point-of-interest (POI) streaming. This example includes some features and/or steps that are similar to those shown in FIGS. 7 and 8, and described above. At least some of these features and/or steps may not be separately described in this section.

The method 900 includes, at step 910, activating location tracking and the POI streaming process. In some embodiments, activating location tracking may include determining a starting location. In an example, the starting location may be latitude and longitude coordinates. In another example, the starting location may be a street address. In yet another example, the starting location may be determined using a satellite positioning system (e.g., GPS or GALILEO) or based on information saved locally in the vehicle's database. In some embodiments, the location may be periodically or continuously updated. In some embodiments, the starting location of the vehicle and its direction of travel may be transmitted to the server platform.

In some embodiments, method 900 may include verifying that the sensors are operating as intended and that the connection to the server is still active. In some embodiments, the connection includes the one or more connections between the in-vehicle computing platform and the mobile phone, tablets or computing devices of the passengers. For example, connections that may need to be established or verified include cellular, Wi-Fi, Bluetooth, dedicated short-range radio communication (DSRC) and/or near-field communication (NFC) protocols.

The method 900 includes, at step 920, gathering POI data based on location tracking and the direction of travel. In some embodiments, the corridor engine on the server uses the starting location and the direction of travel of the vehicle to compile a POI list, on the remote server, corresponding to the street or road being traveled upon. In an example, the POI data with be gathered for an initial predetermined distance, and then updated for each subsequent distance increment. In an example, the POI list may be compiled based on the speed of the vehicle; e.g., at higher speeds, the distance increment will be larger, whereas at lower speeds, the distance increment will be shorter.

In some embodiments, and in the context of step 920, the POI list compiled on the remote server may include, for each POI, a reference or index number, a description, a location (e.g., latitude/longitude or street address), a classification (e.g., a category or subcategory), and any general information, including images, that may be available (e.g., hours of operation, user reviews, entrance fees or average amount spent at this POI, etc.).

The method 900 includes, at step 930, recognizing a gesture made by the user. In some embodiments, recognizing the gesture starts the rendering of the POI streaming event. In an example, and as previously described in the context of FIGS. 5A and 5B, the gesture may be the user pointing out the left-hand or right-hand windows. In another example, the gesture may include a voice trigger (e.g., "what is that?"). In some embodiments, the location of the vehicle and a timestamp are recorded when the user gesture is recognized. In some embodiments, information related to the gesture, and optionally passenger information, is transmitted from the vehicle to the remote corridor engine.

The method 900 includes, at step 940, curating POI information based on the gesture. In some embodiments, only the POI information indicated by the gesture or voice trigger are selected from the previously compiled POI list. In some embodiments, the POI information indicated by the gesture or voice trigger, as well as adjacent and/or similar POIs, are selected from the previously compiled POI list. In some embodiments, the corridor engine may then further curate the selected POIs to eliminate POIs, or reorder the list, based on known preferences of the identified passenger.

In some embodiments, the method 900 further includes the remote server platform transmitting the curated POIs to the in-vehicle communicating platform. In some embodiments, the curated POIs may include lists for multiple passengers in the vehicle.

The method 900 includes, at step 950, displaying the curated POI information and/or options that were received from the remote server. In some embodiments, a predetermined number of POIs are displayed to the user and a rolling scroll provided to allow the user to peruse subsequent or additional POIs. In some embodiments, the POI list for the primary passenger may be displayed on the vehicle's main display system, and POI lists for the other passengers displayed on their mobile phones, tablets or computing devices. In some embodiments, displaying the POI information may include displaying one or more fields that were stored in the compiled POI list (and as described in the context of step 920). For example, only a few of the fields may be initially displayed.

In some embodiments, the method 900 may further include confirming or validating the gesture(s) made by the (one or more) passenger(s) and the vehicle location. In an example, if the vehicle is traveling at high speed, the POI list may need to be updated if the initial gestured POI is no longer accessible, or if the system recognizes that the passenger has now gestured to a new POI. Upon determining that the initial POI is still of interest to the passenger, at step 960, the specific details or information regarding that POI may be displayed to the passenger. In some embodiments, the remaining fields that were not initially displayed may now be provided to the user with detailed information regarding the selected POI. In some embodiments, the vehicle may then be directed to move toward that POI.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A camera system for use with a vehicle, comprising:
a processor;
an external camera system coupled to the processor, wherein the external camera system is configured to capture a first set of images of an area around the vehicle;
an internal camera system coupled to the processor, wherein the internal camera system is configured to capture a second set of images of one or more passengers inside the vehicle; and
a display system coupled to the processor,
wherein the processor is configured to:
recognize, based on the second set of images, at least one gesture made by the one or more passengers,
determine, based on the second set of images, a pose of at least one passenger of the one or more passengers,
determine, based on the second set of images and the determined pose of the at least one passenger of the one or more passengers, a field of view of the at least one passenger of the one or more passengers,
modify the first set of images based on the determined field of view of the at least one passenger of the one or more passengers to correspond to the actual field of view of the one or more passengers, wherein the processor is configured to modify the first set of images at least by overlaying adjacent images of the first set of images, wherein the modified first set of images captures a portion of the area around the vehicle that the at least one passenger was viewing at the time that the at least one passenger made the at least one gesture,
identify, based on the modified first set of images and the at least one gesture, an object or location located outside the vehicle that the user gestured at,
receive a point-of-interest stream,
display graphical representations of a plurality of points-of-interest from the point-of-interest stream in an augmented reality format on the window surface before the processor recognizes the at least one gesture, and
display, using the display system, information from the point-of-interest stream related to the object or location to the one or more passengers on a window surface of the vehicle,
wherein the identified object or location located outside the vehicle corresponds to one of the plurality of points-of-interest, and
wherein the display system displays the information related to the object or location in an augmented reality format on the window surface.

2. The system of claim 1,
wherein the processor is further configured to determine a location of the vehicle, and
wherein the processor is configured to identify the object or location located outside the vehicle further based on the location of the vehicle.

3. The system of claim 1,
wherein the information related to the object or location is selected from a point-of-interest dataset.

4. The system of claim 3,
wherein the point-of-interest dataset is generated based on a location of the vehicle.

5. The system of claim 4,
wherein the point-of-interest dataset is generated further based on a direction of travel of the vehicle.

6. The system of claim 1,
wherein the at least one gesture includes a pointing gesture.

7. The system of claim 1,
wherein the processor is configured to determine the field of view of the at least one passenger of the one or more passengers additionally based on relative locations of one or more windows of the vehicle and one or more cameras of the internal camera system.

8. The system of claim 1,
wherein the processor is configured to modify the first set of images based on the determined field of view of the at least one passenger of the one or more passengers at least by cropping, rotating, and resizing at least one image of the first set of images, and
wherein the external camera system is capable of capturing images 360 degrees around the vehicle.

9. A method for use with a vehicle, comprising:
capturing a first set of images of an area around the vehicle;
capturing a second set of images of one or more passengers inside the vehicle;
recognizing, based on the second set of images, at least one gesture made by the one or more passengers;
determining, based on the second set of images, a pose of at least one passenger of the one or more passengers;
determining, based on the second set of images and the determined pose of the at least one passenger of the one or more passengers, a field of view of the at least one passenger of the one or more passengers;
modifying the first set of images based on the determined field of view of the at least one passenger of the one or more passengers to correspond to the actual field of view of the one or more passengers, wherein modifying the first set of images includes at least overlaying adjacent images of the first set of images, wherein the modified first set of images captures a portion of the area around the vehicle that the at least one passenger was viewing at the time that the at least one passenger made the at least one gesture;
identifying, based on the modified first set of images and the at least one gesture, an object or location located outside the vehicle that the user gestured at;
displaying information from the point-of-interest stream related to the object or location to the one or more passengers on a window surface of the vehicle,
receiving a point-of-interest stream; and
displaying graphical representations of a plurality of points-of-interest from the point-of-interest stream in an augmented reality format on the window surface before the recognizing the at least one gesture,
wherein the identified object or location located outside the vehicle corresponds to one of the plurality of points-of-interest, and
wherein the displaying the information related to the object or location is performed so that the information related to the object or location is displayed in an augmented reality format on the window surface.

10. The method of claim 9, further comprising:
determining a location of the vehicle,
wherein the identifying the object or location located outside the vehicle is further based on the location of the vehicle.

11. The method of claim 9, further comprising:
wherein the information related to the object or location is selected from a point-of-interest dataset.

12. The method of claim 11,
wherein the point-of-interest dataset is generated based on a location of the vehicle.

13. The method of claim 12,
wherein the point-of-interest dataset is generated further based on a direction of travel of the vehicle.

14. The method of claim 9,
wherein the at least one gesture includes a pointing gesture.

15. The method of claim 9,
wherein determining the field of view of the at least one passenger of the one or more passengers is performed additionally based on relative locations of one or more windows of the vehicle and one or more cameras of the internal camera system.

16. The method of claim 9,
wherein modifying the first set of images based on the determined field of view of the at least one passenger of the one or more passengers is performed at least by cropping, rotating and resizing at least one image of the first set of images,
wherein the capturing the first set of images of an area around the vehicle is performed by an external camera system, and
wherein the external camera system is capable of capturing images 360 degrees around the vehicle.

* * * * *